United States Patent [19]

Moskal

[11] 4,392,610
[45] Jul. 12, 1983

[54] HEAT SCAVENGER

[76] Inventor: John F. Moskal, Box 266, Nanjemoy, Md. 20662

[21] Appl. No.: 136,673

[22] Filed: Apr. 2, 1980

[51] Int. Cl.³ .............................................. F24B 7/00
[52] U.S. Cl. .......................... 237/5 S; 165/DIG. 12; 126/101; 122/20 B
[58] Field of Search ............... 122/20 B; 165/DIG. 2, 165/DIG. 12, 1, 7, 9.3, 65; 237/53, 55; 126/101

[56] References Cited

U.S. PATENT DOCUMENTS

| | | | |
|---|---|---|---|
| 1,999,148 | 4/1935 | Anderson | 165/65 |
| 2,545,206 | 3/1951 | Main | 237/8 R |
| 2,710,725 | 6/1955 | Duy | 237/8 R |
| 3,896,992 | 7/1975 | Borovina et al. | 122/20 B |
| 4,066,210 | 1/1978 | Pemberton et al. | 237/53 |
| 4,083,398 | 4/1978 | Fallon, Jr. et al. | 165/DIG. 12 |
| 4,183,399 | 1/1980 | Seehausen | 165/DIG. 12 |
| 4,210,102 | 7/1980 | Dosmann | 122/20 B |

Primary Examiner—Albert J. Makay
Assistant Examiner—Henry Bennett
Attorney, Agent, or Firm—Sherman Levy

[57] ABSTRACT

A heat scavenger or heat recovery system is provided for use with a furnace such as a hot air furnace, wherein the incoming air to the furnace is preheated, and wherein the exhaust or waste heat that is ordinarily lost up the chimney is recovered and used for preheating the incoming air for the furnace to be used in a home or other building.

5 Claims, 4 Drawing Figures

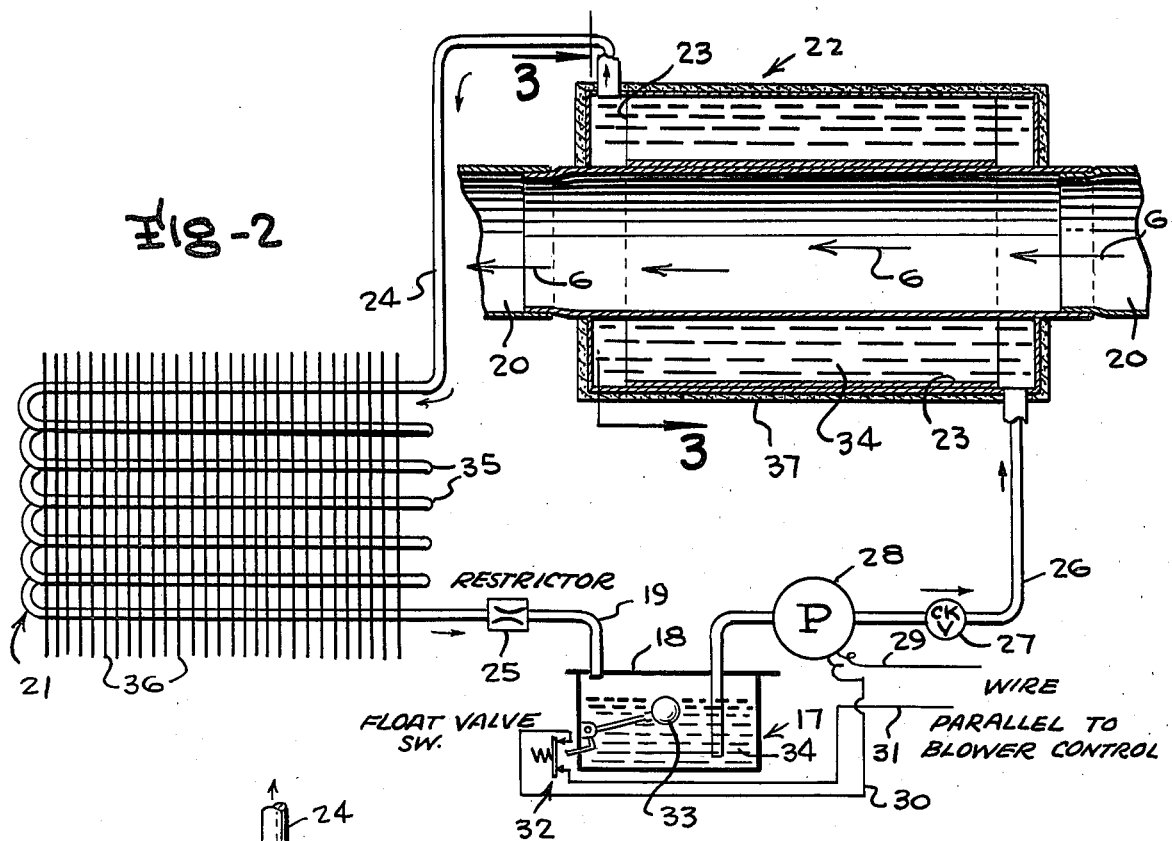
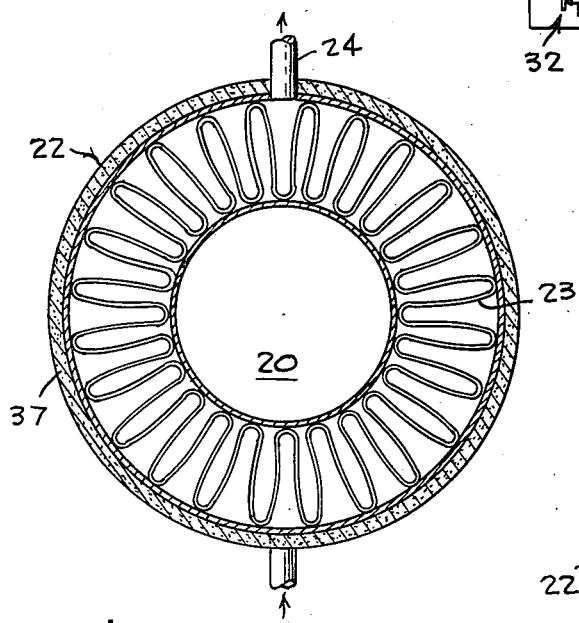
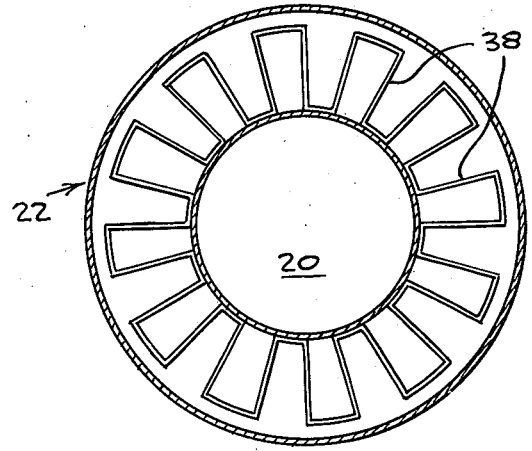

HEAT SCAVENGER

FIELD OF THE INVENTION

The present invention is concerned with a heating system, and more particularly, to a heat recovery system for a hot air furnace and the like.

DESCRIPTION OF THE PRIOR ART

Heretofore various types of heating systems have been provided as for example attention is directed to prior U.S. Pat. Nos. 4,066,210; 4,079,778; 4,090,492; 2,962,218; and 3,086,710. However, neither these prior patents nor any others known to applicant achieve the advantages of the present invention.

BACKGROUND AND SUMMARY OF THE INVENTION

The present invention is a heat recovery system which is especially suitable for use with hot air furnaces for individual homes and the like. With the present invention a suitable fluid such as ethylene glycol or a high boiling point type of fluid is caused to selectively circulate so that the fluid is heated by waste heat ordinarily discharged through the chimney, and wherein this waste heat is caused to preheat the incoming cold air for the furnace so that important savings in efficiency and costs of heating homes and the like is achieved.

It is an object of the present invention to provide a heating system wherein there are no coils or lines inside the flue itself which would have a tendency to corrode or restrict the flue gas or permit leakage of the flue gas.

A still further object of the present invention is to provide a heat recovery system that is small and compact and wherein the average homeowner can readily install the unit on their present furnace with ease and in a short period of time.

Still another object of the present invention is to provide a waste heat recovery system which can be conveniently and easily installed and wherein the device is of an inexpensive construction which is efficient to use, and wherein the device is ruggedly constructed and foolproof in operation.

A still further object of the present invention is to provide a system that is self-contained and wherein there is no need to connect to domestic water to refill the system, thereby eliminating water regulating valves and such components.

The above and other features and objects of the invention will be apparent to those skilled in the art to which this invention pertains from the following detailed description and the drawings.

BRIEF DESCRIPTION OF THE DRAWINGS

FIG. 2 is a diagrammatic view illustrating the present invention.

FIG. 3 is a sectional view taken on the line 3—3 of FIG. 2.

FIG. 4 is a view similar to FIG. 3 but illustrating an alternative or modified form of the invention with a different construction of fin arrangement.

DESCRIPTION OF THE PREFERRED EMBODIMENT

Figure 1:
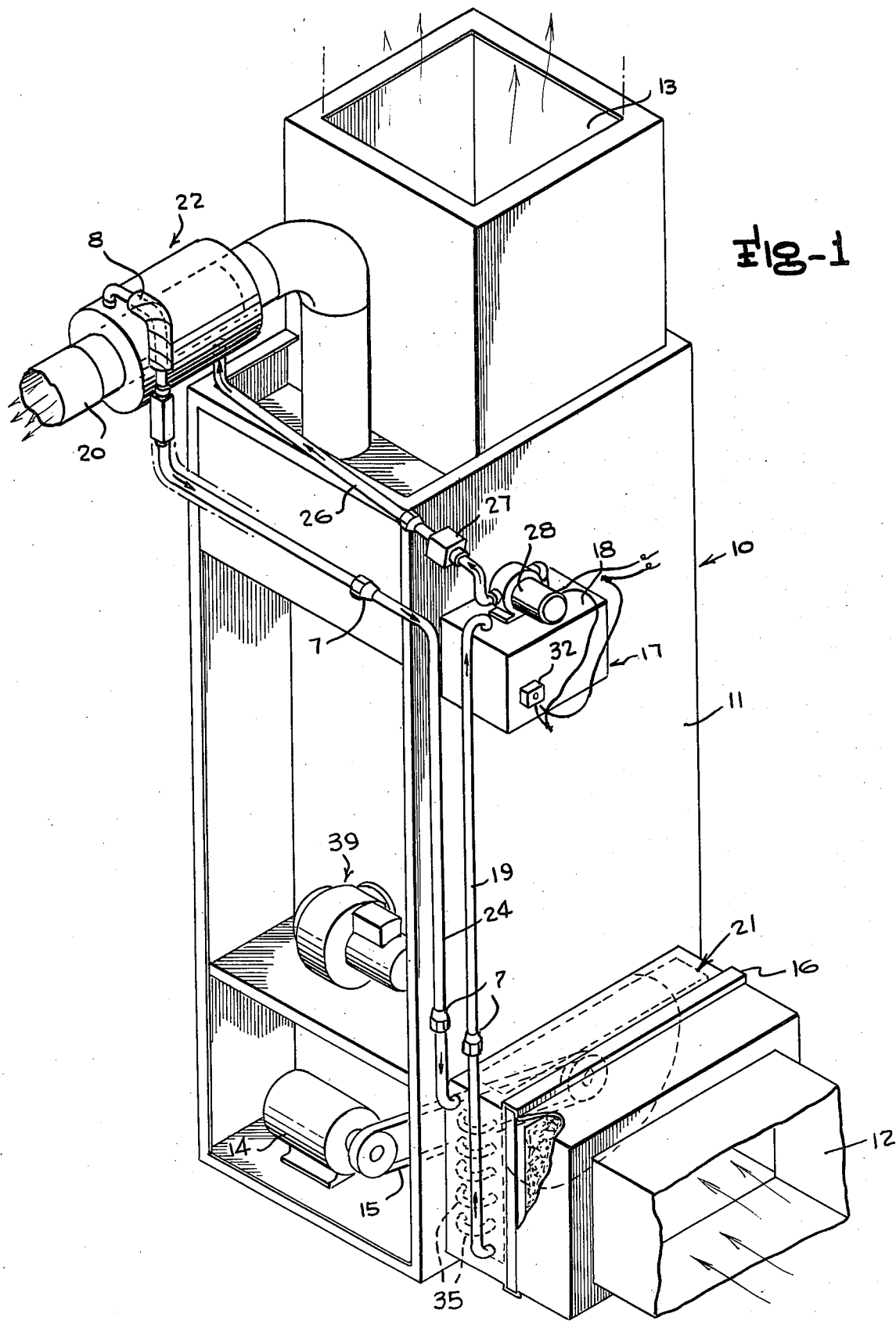
FIG. 1 is a perspective view showing a furnace equipped with the heat scavenger of the present invention.

Referring in detail to the drawings, the numeral 10 indicates a conventional furnace for heating a home or the like and the furnace and includes the usual outer housing or structure 11, FIG. 1. The numeral 12 indicates the return air intake for the furnace, and the numeral 13 indicates the heated air outlet for discharging hot or warm air into various parts of the home or other building. The furnace 10 is provided with the usual motor 14 for operating a blower by means of an endless belt 15. A conventional air filter 16 is provided as shown.

In accordance with the present invention, there is provided a heat scavenger or heat recovery system which is adapted to be used for preheating the air such as the cold air entering the air intake 12 so that the home or other building can be heated or warmed with important fuel savings.

As shown in FIG. 2 for example, the heat scavenger includes a fluid reservoir tank 17 that has a top portion 18, and the numeral 20 indicates the flue. A first conduit 19 has one end connected to or communicating with the reservoir tank 17 as shown in FIG. 1. The other end of the conduit 19 is operatively connected to a finned coil or radiator 21.

The numeral 20 indicates the flue or pipe for the furnace, and the numeral 21 indicates a coil or radiator that is arranged adjacent to filter 16, and the radiator coil 21 is spaced inwardly from the filter 16 so that the filter 16 will remove foreign particles from the incoming air before the air comes in contact with the radiator coil 21.

As shown in the drawings there is provided a heat exchange member 22 which is in the form of a hollow casing or housing that surrounds a portion of the flue 20, FIG. 2, and arranged in the heat exchange member 22 are fins 23 which help increase the efficiency of the heat transfer. The numeral 24 indicates a second conduit or line which operatively connects the heat exchange member 22 to an end of the radiator coil 21 as shown in the drawings. A restrictor 25 is arranged as shown for a purpose to be later described. The numeral 26 indicates a third conduit which operatively connects a portion of the heat exchanger 22 to a pump 28, and a check valve 27 is arranged in the line or conduit 26. The pump 28 has electrical conductors or wires 29 and 30 connected thereto for electrically connecting the pump 28 into a circuit, and the wires 29 and 31 are wired parallel to the blower control eliminating the need of additional controls. The numeral 32 indicates a float switch for the reservoir tank 17, and a float 33 is movably mounted in the reservoir tank 17, and is responsive to the level of glycol 34 in the tank 17. The radiator coil assembly 21 includes coiled tubular portions 35 which have heat exchanging fins 36 associated therewith, FIG. 2. The numeral 37 indicates insulation for the heat exchanger 22. Arranged within the heat exchanger 22 are the fins 23, FIG. 3. In FIG. 4 there is illustrated an alternative or modified form of fins 38 that are adapted to be used in lieu of or instead of the fins 23.

The furnace 10 is heated in the usual manner by burning oil, gas, or the like. Normally a portion of the heat for use in heating the incoming air is wasted by passing up through the flue 20 and out through the usual chimney. With the present invention, due to the provision of the heat exchanger 22, it will be seen that heat from the waste heat leaving the flue 20 will be transferred to the fluid 34 in the element 22. This warm fluid 34 will then flow through the conduit 24 into the radiator coil unit 21 to give up its heat or transfer its heat to the incoming cold air which enters the air intake 12. The fluid 34 in unit 21 will thus be cooled, and this fluid is circulated through the conduit 26 back to the heat exchanger 22 whereby the process is repeated in a continuous fashion.

As shown in FIG. 2, the reservoir tank 17 is provided with a float 33 and float switch 32. Thus, when the level of fluid 34 in the tank 17 decreases below a predetermined level, the switch 32 will be actuated to stop the pump 28 to prevent damage to it. It will be noted that the heat exchanger 22 has the plurality of fins 23 arranged therein, and this construction serves to assure that the heat transfer will take place with maximum efficiency. Instead of using the fins 23 of FIG. 3, a fin arrangement 38 as shown in FIG. 4 can be utilized. The air entering through intake 12, and at this point, fluid 34 is cooled, and this fluid then flows through the conduit 19 back to the reservoir tank 17. Subsequently, the pump 28 pumps the fluid from the tank 17 through the line or conduit 26 back to the heat exchanger 22, so that fluid can again be heated and this cycle is continuous when the unit is being used.

The present invention is especially suitable for use with hot air furnaces for individual homes and the like. The apparatus can be used on gas furnaces, oil furnaces and the like. The apparatus is inexpensive and simple to install and operation is automatic. The furnace burner starts when the furnace comes on, and the blower starts at a predetermined temperature, and the pump 28 starts at the same time the blower motor 14 starts operating. The check valve 27 prevents the fluid from going in the wrong direction when the pump is not running. The restrictor 25 serves to restrict the flow out of the coil unit 35 so as to properly regulate the flow of fluid through the system. When the burner and blower shut off, there is still heat going up the stack. Because the glycol is not circulating, the glycol picks up the heat while just laying there idle. The various conduits and parts are suitably insulated so that there will be no loss of heat between the scavenger 22 and rejection coil 21.

In certain of the prior patents, radiator coils and the like are mounted directly or in a room, whereas with the present invention, air is circulated throughout the entire house instead of just one room, because the heat rejection coil is in the return air stream.

The furnace 10 includes a conventional oil burner 39 having suitable accessories provided therewith. Suitable insulation can be provided wherever needed.

In operation when the burner is on, the hot flue gases heat the glycol 34 in the heat scavenger of the present invention which is suitably insulated. The check valve 27 prevents the hot glycol from backing up in the reservoir 17. When the furnace blower 14 starts, the pump 28 also starts, because the pump 28 is wired parallel to the blower motor 14 as for example as indicated by the wires or conductors 29, 30 and 31. This causes the hot glycol to circulate to the heat rejection coil 21. Return air moving across the coil unit 21 removes the heat from the glycol 34. The restrictor 25 slows down the flow to achieve maximum heat transfer to the air stream. In the event of loss of glycol 34, the float switch 32 shuts down the entire heat scavenger system due to the provision of the float 33. However, this does not affect the operation of the furnace. The scavenger or heat recovery system of the present invention thus reclaims lost heat that ordinarily goes up the chimney. In FIG. 1 the numeral 13 indicates the warm air duct, while number 12 indicates the cold air inlet duct.

It will be seen that the present invention is a heat miser or heat scavenger that includes a tubular member 22 that surrounds the flue pipe 20, and member 22 is in the form of a hermetically sealed tank that surrounds the flue pipe 20 to increase surface contact and improve heat transfer.

In the present invention there are no coils or lines inside the flue itself which have a tendency to corrode or restrict the flue gas or permit leakage of the flue gas. There is no need for an expansion chamber for any expansion of glycol will return it to the reservoir. Very little evaporation of the glycol occurs, but additional glycol can be added when needed. The pump 28 is wired parallel to the furnace blower motor 14 thereby eliminating additional controls and the pump 28 only runs when the blower motor 14 runs. Because the heat exchanger is the same diameter as the flue pipe and is an integral part of the flue pipe, this system can be used in units using metal chimneys of the same diameter without restricting them.

The present invention is for oil and gas fired hot air furnaces used in homes, and the like, and the recovery system is small, compact and relatively inexpensive. The average homeowner can install the unit himself in a few hours. The present invention is adaptable to all types of furnaces and is installed outside of the furnace rather than being installed internally. It can be installed in most homes and uses flue gas a source of heat. The device is adaptable to home heating systems and the like.

As previously stated, the flue pipe and tank 22 are a hermetically sealed unit without any obstruction to the flue gases. The inner fin construction 23 increases the surface area for heat transfer. The unit is one complete system that can be installed in any oil fired or gas fired hot air furnace.

The parts can be made of any suitable material and in different shapes or sizes as desired or required.

With further reference to the drawings, the heat passing through the flue 20 is used for heating the fluid 34 in the heat exchanger 22, and this warm or heated fluid flows from the heat exchanger 22 through the conduit 24 to the coil unit 21. In the coil unit 21, the heat from the heated fluid 34 is given up to the incoming cold air to preheat the air whereby important fuel savings and economy is achieved because the heat that is normally wasted going up the chimney is used to preheat the air.

The system of the present invention is self-contained and there is no need to connect to domestic water to refill the system, thereby eliminating water regulating valves and such components.

While the heat exchange member 22 is shown in FIG. 1 mounted on a horizontal portion of the flue 20, it is to be understood that the member 22 can also be used in a vertical position. Also in FIG. 1 the numeral 25 illustrates the restrictor, and the numeral 8 indicates insulation that can be provided wherever desired or required. The flare connections 7 can be mounted on or provided in the various conduits as deemed necessary.

The outlet line from the scavenger is insulated as at 8. Also in FIG. 1 the numeral 12 indicates the cold air intake. In FIG. 2 the arrows 6 indicate the flow direction of flue gas.

While several embodiments of the present invention have been illustrated herein in particular detail, it will be understood that variations and modifications may be effected without departing from the spirit and scope of the novel concepts of this invention.

What is claimed is:

1. For use with an existing heating system including a furnace having an air intake for admitting cold air into the furnace, air outlet means for distributing air exiting from said furnace, and a flue pipe defining an exhaust path to the ambient of undesired combustion gases, a portable readily detachable heat scavenger comprising:
   means for absorbing heat from said flue pipe;
   heat exchange coil means for radiating heat located in said cold air downstream of said air intake;
   a reservoir tank mounted externally of said furnace;
   means for interconnecting said absorbing means, said coil means and said reservoir tank;
   said reservoir tank, said absorbing means, said coil means and all of said interconnecting means containing heat exchange fluid;
   pump means for moving said fluid through said interconnecting means;
   said interconnecting means including restrictor means, positioned downstream of said coil means, for maintaining flow of said fluid therefrom at a constant rate, said restrictor means being chosen so that the time of travel of said fluid through said coil means is maximized, said restrictor means further being positioned upstream of said reservoir tank and discharging directly thereinto;
   said absorbing means including inner and outer concentric shell members, said inner member being in direct contact with said combustion gases, as well as in line with, and concentrically secured to said flue pipe, said inner and outer members defining therebetween a chamber through which said heat exchange fluid flows.

2. The structure as defined in claim 1 and further including a float and float switch operatively connected to said reservoir tank.

3. The structure as defined in claim 1 and further including a blower motor for increasing inductive airflow into the furnace, and means electrically wiring the pump, and blower motor in parallel.

4. The structure as defined in claim 2, 3 or 1 and further including fins in said heat exchanger.

5. The structure as defined in claim 4 wherein the system is self-contained and wherein there is no need to connect to domestic water to refill the system, thereby eliminating water regulating valves and such components.

* * * * *